United States Patent [19]
Illy et al.

[11] Patent Number: 5,992,298
[45] Date of Patent: Nov. 30, 1999

[54] COFFEE MACHINE

[75] Inventors: Francesco Illy, Lettenrain 16, CH-6045 Meggen; Matthias Hell, Bern, both of Switzerland

[73] Assignees: Francesco Illy, Meggen; Creaholic S.A., Bienne, both of Switzerland

[21] Appl. No.: 09/104,327

[22] Filed: Jun. 25, 1998

Related U.S. Application Data

[63] Continuation of application No. PCT/CH96/00460, Dec. 13, 1996.

[30]  Foreign Application Priority Data

Dec. 28, 1995  [CH]  Switzerland .............................. 3686/95

[51] Int. Cl.⁶ ..................................................... A47J 31/54
[52] U.S. Cl. ................................ 99/281; 99/282; 99/283; 99/285; 99/293; 99/295; 99/302 R
[58] Field of Search .............................. 99/302 R, 302 P, 99/281, 283, 282, 280, 285, 293; 426/433

[56]  References Cited

U.S. PATENT DOCUMENTS 3,795,788  3/1974  Perucca ................................. 99/281 X
4,253,385  3/1981  Illy ............................................ 99/281
4,793,246  12/1988  Barradas ................................... 99/307
5,014,611  5/1991  Illy et al. .................................. 99/280
5,193,139  3/1993  Schiettecatte .......................... 99/283 X
5,551,331  9/1996  Pfeifer et al. ............................ 99/280

*Primary Examiner*—Reginald L. Alexander
*Attorney, Agent, or Firm*—Lacasse & Associates; Randy W. Lacasse; Wesley L. Strickland

[57]  ABSTRACT

The coffee machine for different coffee types requires no preheating time and consumes no energy in the standby mode. It essentially comprises a water supply chamber (1), a pump (5), a continuous flow heater (8) for heating the water and a brewing chamber (10) for receiving the coffee (10'). The continuous flow heater (8) has a low heat capacity and can therefore perform large temperature changes within a short time. In order to obtain the desired water starting temperature, use is made of a control loop. The unheated parts (9–12) along the water path between the continuous flow heater (8) and the coffee (10') are so designed that a minimum amount of heat energy is abstracted from the hot water, but at the same time the parts have an adequate strength.

17 Claims, 5 Drawing Sheets

COFFEE MACHINE

This application is a continuation of PCT/CH96/00460 filed Dec. 13, 1996.

FIELD OF THE INVENTION

The invention relates to a coffee machine.

BACKGROUND OF THE INVENTION

Coffee machines have a water supply or storage chamber, a heating system for heating the water, a brewing, boiling or scalding chamber for receiving coffee and feed means for feeding water from the water supply chamber into the brewing chamber. Conventional coffee machines differ as a function of the coffee type to be prepared with the corresponding coffee machine. Thus, in espresso coffee machines water is heated and pumped by means of a pump under high pressure (approximately 10 bar) into the brewing chamber and the coffee is finely ground. In Mocha coffee machines the water is supplied in the form of steam through a rising tube to the finely ground coffee in the brewing chamber. The water is also supplied in the form of steam through a rising tube in the case of filter coffee machines, but it condenses again and reaches the fine or ground coffee as a hot liquid and then, under ambient pressure, slowly passes through the filter.

The heating system of conventional coffee machines normally comprises a solid electric heating unit, which is a heat reservoir with a high heat capacity and therefore thermally inert. On the one hand, this is an advantage, because its temperature only decreases slightly when a given water volume flows through it and removes from it a specific heat energy. However, on the other hand, the high heat capacity is a disadvantage, because a large amount of heat energy must be supplied to the electric heating unit in order to raise its temperature to a desired value. After switching on, the conventional coffee machine requires a preheating time lasting a few minutes before it can prepare the first coffee. This preheating time constitutes an irksome time loss for the user.

In order not to have to reheat the electric heating unit prior to each preparation of coffee, heat energy is supplied to it for as long as the coffee machine is switched on. Thus, in the standby mode, the coffee machine constantly requires energy, which it delivers to the environment in a useless manner. If the coffee machine has been switched off for a time, the complete, solid electric heating unit must be heated even for a single coffee preparation and only part of the energy required for this is actually used for preparing the coffee. Thus, in summarizing, it can be stated that conventional coffee machines make uneconomic use of the time of the user and electrical energy.

The problem of the invention is to provide a coffee machine, which firstly requires no preheating time and secondly consumes no energy in the standby mode.

This problem is solved by the coffee machine according to the invention, as defined in the claims. The concept of the coffee machine according to the invention is based on the fact of using a rapidly reacting heating means and to remove the minimum amount of heat energy from the hot water on its path to the coffee. Table 1 shows a comparison of the heating means according to the invention and those of a conventional coffee machine.

TABLE 1

| Characteristics of the heating means | Coffee machine according to the invention | Conventional coffee machine |
|---|---|---|
| Heat capacity | low | high |
| Reaction | fast | slow |
| Temperature change during coffee preparation | high | low |

Table 1.

The coffee machine according to the invention is to be polyvalent, i.e. able to prepare different coffee types. This means that the parts used along the water path, as regards to the mechanical strength, must be designed for the "worst case", i.e. for high pressure during espresso preparation. The parts used must also be optimized with regards to mechanical and thermal characteristics and in part account must be taken of contradictory criteria, so as to combine them in a compromise solution The advantages of the inventive coffee machine are inter alia achieved by the combination of the following features. Use is made of a continuous flow heater with a small heat capacity instead of a solid electric heating unit. In order to obtain the desired water starting temperature, use is made of a control loop. Materials and design of the unheated parts along the water path are designed in such a way that they are able to withstand the overpressure of the water and simultaneously remove from said water the minimum possible heat energy. In particular, said unheated parts must have low heat capacities and with respect to water low heat transmission coefficients, whilst simultaneously having an adequate strength.

SUMMARY OF THE INVENTION

In accordance with the invention there is provided a coffee machine having a water supply chamber, a pump and a brewing chamber for receiving coffee comprising: a continuous flow heater for heating water comprising an inner tube for allowing water to flow therethrough, at least one inner insulating layer placed around the inner tube, and a filament wound around the at least one inner insulating layer, said continuous flow heater having a low heat capacity; at least one temperature sensor disposed at the end of the continuous flow heater or between the latter and the brewing chamber; and a control loop in communication with the continuous flow heater, whose controlled variable is the water temperature (T) at the end of the continuous flow heater and that, with respect to mechanical and thermal characteristics, unheated parts along the water path between the continuous flow heater and coffee are so optimized, that they have an adequate strength with respect to an overpressure occurring in the system and have low heat capacities and, with respect to water, low heat transmission coefficients.

In accordance with the invention there is further provided a coffee machine having a water supply chamber, a pump and a brewing chamber for receiving coffee comprising: a continuous flow heater with a low heat capacity for heating water; at least one temperature sensor disposed at the end of the continuous flow heater or between the latter and the brewing chamber; a control loop in communication with the continuous flow heater, whose controlled variable is the water temperature (T) at the end of the continuous flow heater and that, with respect to mechanical and thermal characteristics, unheated parts along the water path between the continuous flow heater and coffee are so optimized, that they have an adequate strength with respect to an overpressure occurring in the system and have low heat capacities and, with respect to water, low heat transmission coefficients; and a microprocessor for monitoring and controlling a pumping power ($P_p$) of the pump, a heating power ($P_h$) of the continuous flow heater, and a heating-up time (t).

A coffee machine having a pump and a brewing chamber for receiving coffee is provided in accordance with the invention comprising: a continuous flow heater with a low heat capacity for heating water; at least one temperature sensor disposed at the end of the continuous flow heater or between the latter and the brewing chamber; a control loop in communication with the continuous flow heater, whose controlled variable is the water temperature (T) at the end of the continuous flow heater and that, with respect to mechanical and thermal characteristics, unheated parts along the water path between the continuous flow heater and coffee are so optimized, that they have an adequate strength with respect to an overpressure occurring in the system and have low heat capacities and, with respect to water, low heat transmission coefficients; and a water supply chamber, said water supply chamber is fitted in a visible manner at the top of the coffee machine, is made from a transparent material, can be removed by a user and is provided with a lid.

In accordance with another aspect of the invention there is provided a coffee machine having a water supply chamber, a pump and a brewing chamber for receiving coffee comprising: a continuous flow heater with a low heat capacity for heating water; at least one temperature sensor disposed at the end of the continuous flow heater or between the latter and the brewing chamber; a control loop in communication with the continuous flow heater, whose controlled variable is the water temperature (T) at the end of the continuous flow heater and that, with respect to mechanical and thermal characteristics, unheated parts along the water path between the continuous flow heater and coffee are so optimized, that they have an adequate strength with respect to an overpressure occurring in the system and have low heat capacities and, with respect to water, low heat transmission coefficients; and a weighted base for improving a stability of the coffee machine.

BRIEF DESCRIPTION OF THE DRAWINGS

The coffee machine according to the invention is described in greater detail hereinafter relative to the attached drawings, wherein show.

DETAILED DESCRIPTION OF THE INVENTION

Figure 1:
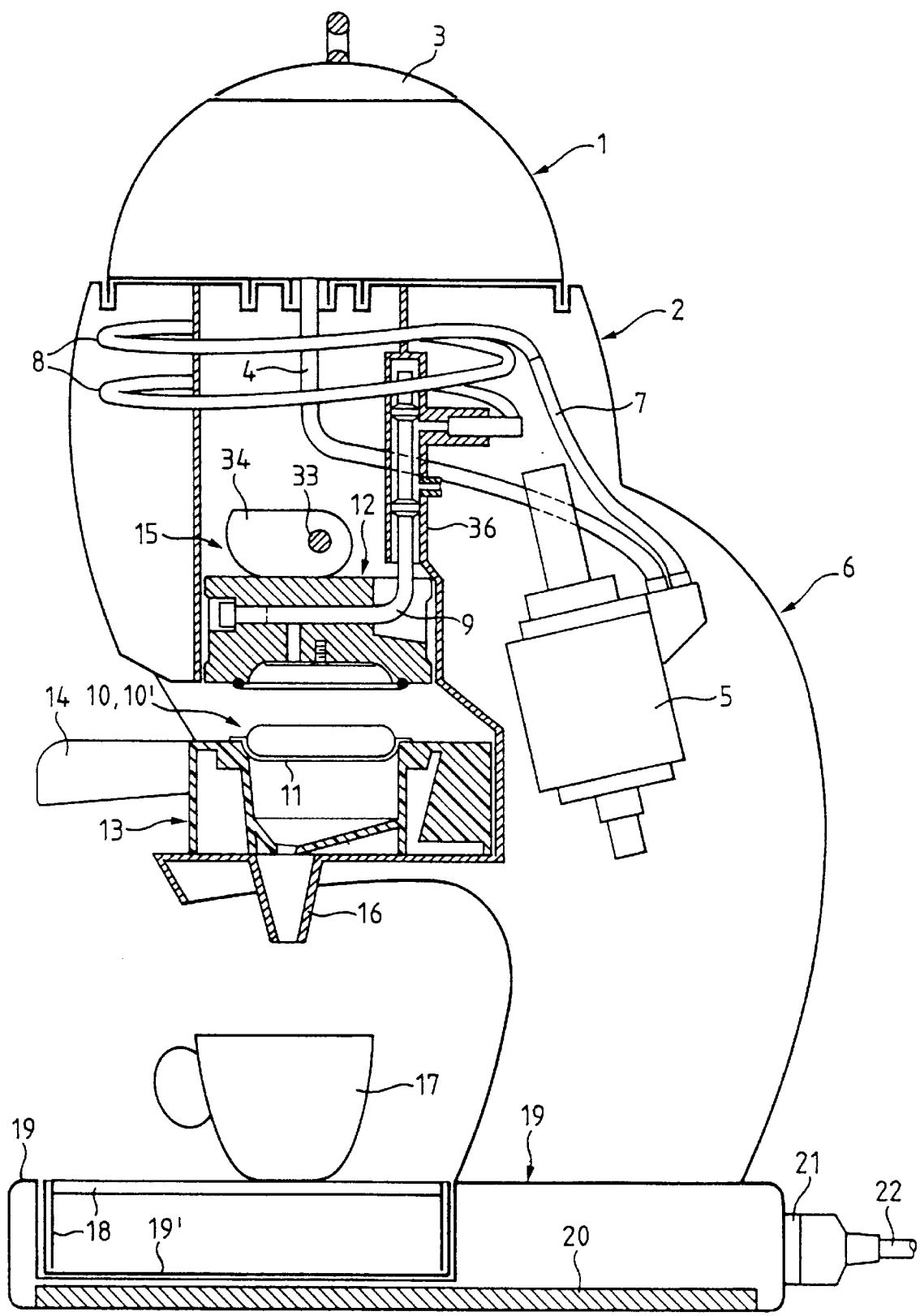
FIG. 1 A diagrammatic cross-section through the complete coffee machine.

FIG. 1 shows in cross-section a diagrammatic overall view of a preferred embodiment of the coffee machine according to the invention. A water supply chamber 1 is mounted on a "head" 2 of the coffee machine. It can be made from a transparent material, which has the advantage that the user can see the water level at all times and can top up with water in good time. The water supply chamber 1 can be removed by the user and washed. It has a lid 3, which rests on in loose manner, can be screwed on with a thread or can be fixed with a hinge.

By means of a hose or tube 4 the water passes from the water supply chamber 1 to a pump 5, which is e.g. located in a "neck" 6 of the coffee machine. The water is pumped by the pump 5 through a hose or tube 7 to a continuous flow heater 8 and through the latter. In the continuous flow heater it is heated to a desired temperature of more than 90° C. or made to evaporate. The continuous flow heater is e.g. in the form of a multilayer tube provided with an electric heating system. The details of pump 5 and continuous flow heater 8 are given hereinafter in connection with FIGS. 2 and 3.

A connecting tube 9, e.g. of stainless steel, connects the continuous flow heater 8 to a brewing chamber 10. It is scarcely avoidable that the water will cool by a few degrees celsius in the connecting tube 9. The brewing chamber 10 contains the coffee 10', through which the hot water or steam is pressed. The brewing chamber 10 essentially comprises a brewing chamber base 11 and a brewing chamber lid 12. The brewing chamber base 11 is inserted in a holder 13 with handle 14. The holder 13 is slid by the user into the coffee machine and fixed to the latter with a locking mechanism 15 and simultaneously the brewing chamber 10 is locked. Details of the brewing chamber 10 and locking mechanism 15 are described in greater detail hereinafter relative to FIG. 4.

The ready, hot coffee flows through a spout 16 out of the brewing chamber 10 into a cup 17. The cup 17 stands on a holding grid 18, which is placed in an insert 19', which is in turn placed in a base 19. The base 19 can be made heavier e.g. with a zinc casting or a lead part 20, in order to improve the stability of the coffee machine. The inlet 21 of a cable 22 for supplying the coffee machine with mains voltage is preferably located in the base 19.

Table 2 shows the water path as a sequence of four portions, which differ on the basis of their temperature and pressure conditions. The numerical values given are of an approximate nature for the exemplified case of espresso preparation and can differ for other coffee types.

Figure 2:
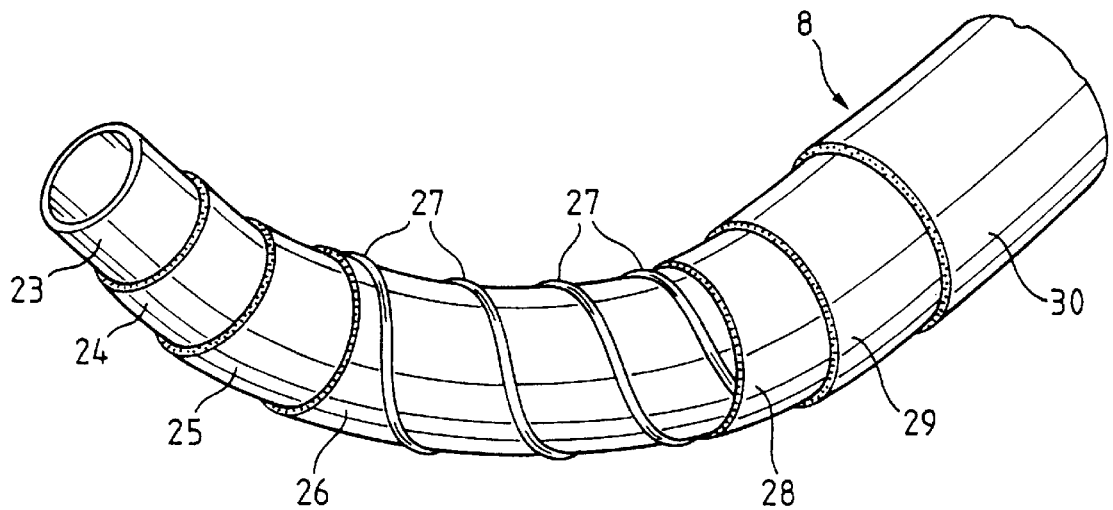
FIG. 2 A perspective view of the continuous flow heater opened out in layer form for clearer representation.

FIG. 2 shows the internal structure of a continuous flow heater 8, such as is preferably used in the coffee machine according to the invention. Compared with a conventional solid electric heating unit, such a continuous flow heater 8 has the advantage of being able to rapidly perform temperature changes. Consequently it requires no preheating and also no energy in the standby mode. In a preferred embodiment, the continuous flow heater 8 comprises an inner tube 23 through which can flow water and which is e.g. made from aluminium, stainless steel or high temperature-resistant plastic. Around the inner tube 23 is placed an internal insulating layer 24–26 made from an electrically insulating, heat-resistant material, e.g. a high temperature-resistant plastic. Around the inner insulating layers 24–26 is wound a filament 27 made from a high-impedance metal alloy, e.g. a NiCr-alloy. Around the filament 27 is placed at least one outer insulating layer 28–30, e.g. once again of high temperature-resistant plastic.

TABLE 2

| Portion | Temperature | Pressure |
| --- | --- | --- |
| Water supply chamber 1 to inlet of pump 5 | low (20° C.) | low (1 bar) |
| Outlet of pump 5 to inlet of continuous flow heater 8 | low (20° C.) | high (10 bar) |
| Outlet of continuous flow heater 8 to inlet of brewing chamber 10 | high (>90° C.) | high (10 bar) |
| Outlet of brewing chamber 10 to cup 17 | high (>90° C.) | low (1 bar) |

Table 2.

Figure 3:
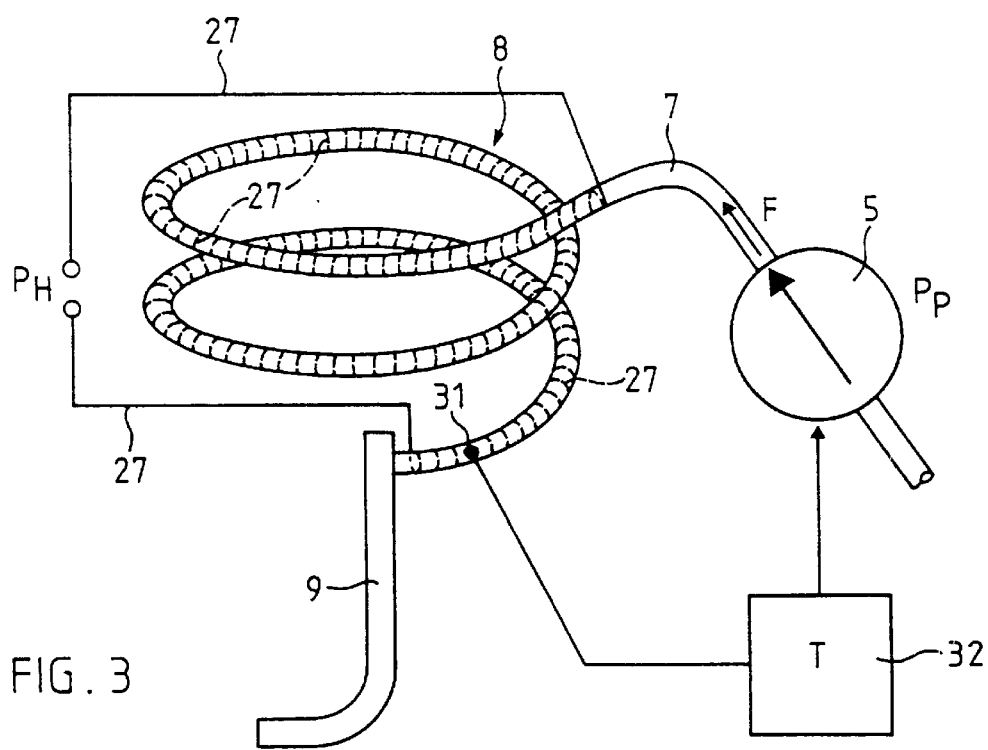
FIG. 3 The continuous flow heater and pump with regulating system.

The continuous flow heater 8 is the main component of the heating system of the inventive coffee machine, the entire heating system being shown in FIG. 3. FIG. 3 only shows the filament 27 of the internal structure of the continuous flow heater 8, which is preferably in the form of a helical spring and is mounted in floating manner. At the inlet of the continuous flow heater 8 is provided the pump 5 with the tube 7, with at its outlet the connecting tube 9. The pump 5 is preferably suspended in mobile or overhung manner and vibrates during operation, in the same way as e.g. occurs with a diaphragm pump. The vibrations are transferred to the continuous flow heater 8. The accelerations forced on the continuous flow heater 8 in this way prevent or reduce liming of its inner tube 23 or aid lime detachment from the tube inner walls.

The continuous flow heater 8 is preferably equipped with a control loop, which ensures that during each coffee preparation, the water leaves the heater with the desired temperature. For this purpose, towards the end of the continuous flow heater 8 is provided a temperature sensor 31 for measuring the water temperature T. The measured temperature T is preferably the controlled variable for the power $P_P$ of the pump 5 and therefore for the water flow F. In another variant, the temperature T is the controlled variable for the heating power (or heating capacity) $P_H$ in the filament 27. In a third variant both the pumping power (or pumping capacity) $P_P$ and the heating power $P_H$ are simultaneously regulated. For regulation or control purposes, use is preferably made of a microprocessor 32, which is preferably installed in the vicinity of the pump 5. In place of the microprocessor 32, a simpler electronic circuit can be used for regulating purposes.

The temperature sensor 31 and microprocessor 32 are also required in order to warn the user of liming of the continuous flow heater 8. A possible layer of lime on the continuous flow heater inner tube wall acts in an insulating manner and increases the time t needed at a given heating power $P_H$ in order to heat a given water quantity. Thus, conclusions regarding the liming of the tube or pipe can be drawn on the basis of the heating power $P_H$, pumping power $P_P$ and the heating-up time t. For each coffee preparation the microprocessor checks whether the liming of the tube has not exceeded a critical value. If it has exceeded such a value, the user is warned by an acoustic and/or optical signal. After such a warning the user can take appropriate deliming measures.

The brewing temperature has a very sensitive influence on the taste of the coffee. Despite the inventively reached time and energy saving, the coffee quality must remain constantly high and must not be dependent on whether the unheated parts 9–12 along the water path between the continuous flow heater 8 and the coffee 10 are cold or already hot due to a preceding brewing operation. Thus, only minimum heat energy must be abstracted from the hot water between the continuous flow heater 8 and the coffee 10'. For this purpose two requirements must be fulfilled. Firstly the unheated parts 9–12 along the water path must have low heat capacities, i.e. low specific heat capacities and low masses. Secondly, the unheated parts 9–12 must have low heat transmission coefficients with respect to water, i.e. low heat transfer coefficients and/or low thermal conductivities. However, simultaneously the unheated parts 9–12 must be able to withstand the overpressure of the hot water of approximately 10 bar, such as occurs in espresso preparation. The materials and design of these parts 9–12 must be optimized with respect to the thermal and mechanical, partly opposing criteria. The exemplified embodiment provides a good solution to the optimization problem. The connecting tube 9 is short and mechanically firm. The base 11 and lid 12 of the brewing chamber 10 are made from a thermally insulating material, e.g. a highly porous, ceramic material such as hollow ceramic or hollow porcelain or a thermally insulating plastic, the mass or weight being kept as low as possible.

Figure 4:
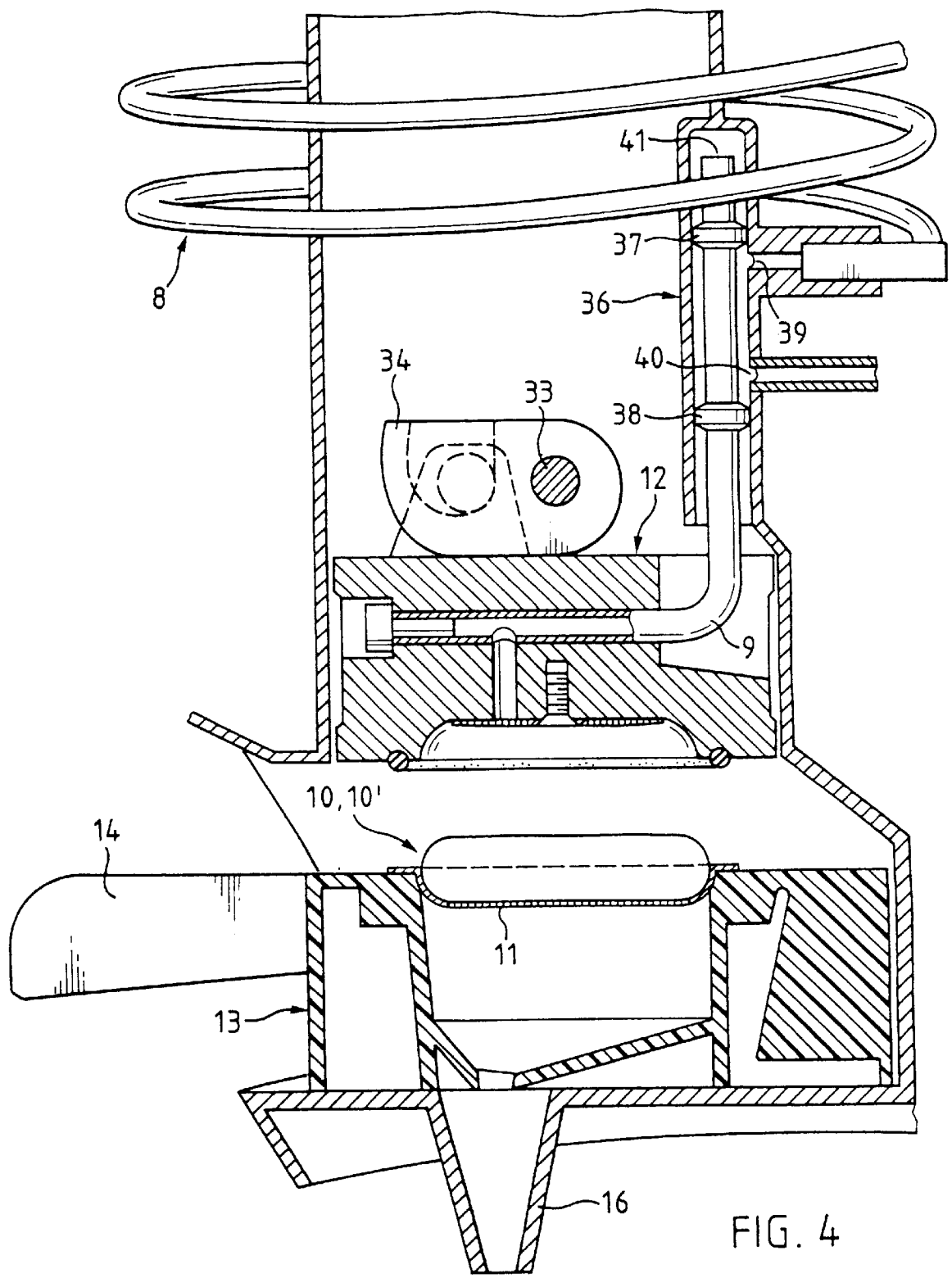
FIG. 4 A cross-section through the brewing chamber and its locking mechanism.
Figure 5:
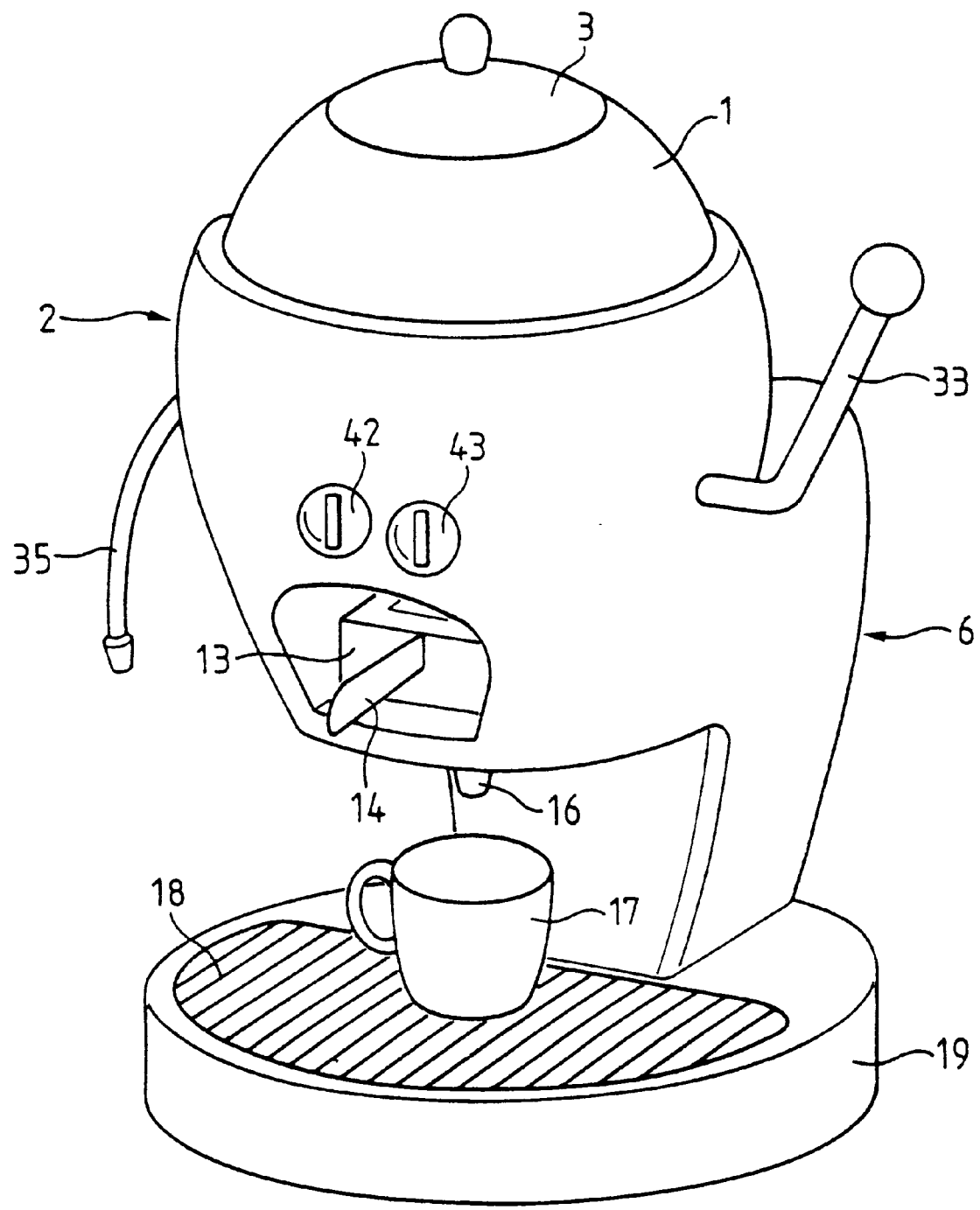
FIG. 5 An outside view of the coffee machine.

The locking mechanism 15 of the brewing chamber 10 and the brewing chamber itself will be discussed by means of FIG. 4. In conventional coffee machines the brewing chamber holder is fixed and simultaneously locked by a bayonet fastening or catch to the coffee machine. However, in the coffee machine according to the invention, the brewing chamber 10 is incorporated into a holder 13, which is held by the user with one hand on the handle 14 and shoved in drawer-like into the coffee machine. The holder 13 can be made from plastic. Using the other hand the user operates the locking mechanism by means of a lever 33, visible in FIG. 5, fitted to the outside of the coffee machine casing. The rotary movement of the lever 33 is transferred to an eccentric 34, which moves the brewing chamber lid 12 downwards and locks the brewing chamber 10. By moving the lever 33 in the opposite direction, the brewing chamber lid 12 is raised and the brewing chamber 10 opened, so that the holder 13 can be removed and the coffee 10' replaced.

The water outlet is also controlled through the movement of the lever 33 or brewing chamber lid 12. Only when the brewing chamber lid 12 is in the lower position, i.e. with the brewing chamber 10 closed, does hot water flow into the brewing chamber and from there into the coffee cup 17. However, if the brewing chamber lid 12 is in the upper position and the brewing chamber 10 is open, the hot water or, as desired, steam flows out of the coffee machine through a steam pipe 35. The hot water from the steam pipe 35 could e.g. be used for making tea and the steam e.g. for heating milk.

The switch point position for one of the two paths is at the inlet of the connecting tube 9. The connecting tube 9 is in a tube casing 36, the latter being sealed with two sealing rings 37, 38 and is moved together with the brewing chamber lid 12. In the upper position the upper sealing ring 37 is above the water inlet 39 and prevents the flow of hot water or steam into the connecting tube 9, so that the hot water or steam then flows to the inlet 40 of the steam pipe 35. In the lower position, the upper sealing ring 37 is below the water inlet 39 and then the hot water flows to the inlet 41 of the connecting tube 9.

A type switch 42 is fitted to the coffee machine according to the invention for choosing the desired coffee type. It can e.g. have the positions "espresso", "Mocha", "filter coffee", "capuccino" or other positions or settings. By means of the type switch 42, different programs of the microprocessor 32 are selected, which in each case set the desired water temperature T and correct pumping capacity $P_P$.

For different coffee types different brewing chamber bases 11 are provided and can be inserted in module manner in the holder 13. The brewing chamber base 11 for espresso or Mocha coffee is a screen-like, perforated plate made from thermally insulating material. For making filter coffee the brewing chamber base 11 must be able to receive a filter and must have a corresponding spout. The coffee 10' is filled in the intended form into the brewing chamber: unpacked or packed in suitable containers, e.g. bags.

Apart from the holder 13, lever 33 and type switch 42, the inventive coffee machine only has a single control member, namely a master switch 43. The latter has three positions, which can e.g. be called "steam", "off" and "coffee" and combines two functions. It is firstly the switch for putting the entire coffee machine into and out of operation. In the "off" position the coffee machine is switched off and consumes no energy, unlike conventional coffee machines in the standby mode. The user determines the coffee quantity to flow out, in that he starts off the coffee flow by switching from "off" to "coffee" and subsequently stops the flow by switching from "coffee" to "off". The same applies with respect to the steam quantity. Secondly the master switch is a thermostat for the medium flowing out of the steam pipe 35. If the lever 33 is in the upper position, in the master switch position "steam", steam flows out of the steam pipe 35, but in the master switch position "coffee" hot water flows out. In addition, in the master switch position "steam", the water inflow is mechanically blocked when the lever 33 is in the lower position. Table 3 summarizes the effects of all possible lever and master switch positions. The coffee machine according to the invention can, if desired, also be equipped with a device for automatically regulating the coffee quantity.

Figure 6:
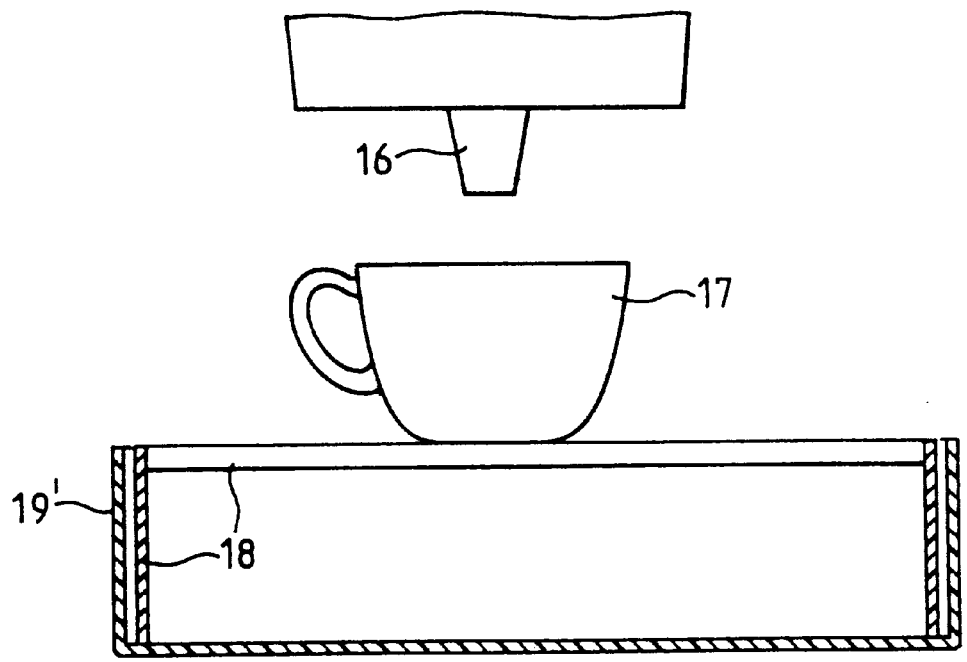
FIGS. 6 & 7 Cross-sections through the holding grid with two cups of different size.
Figure 7:
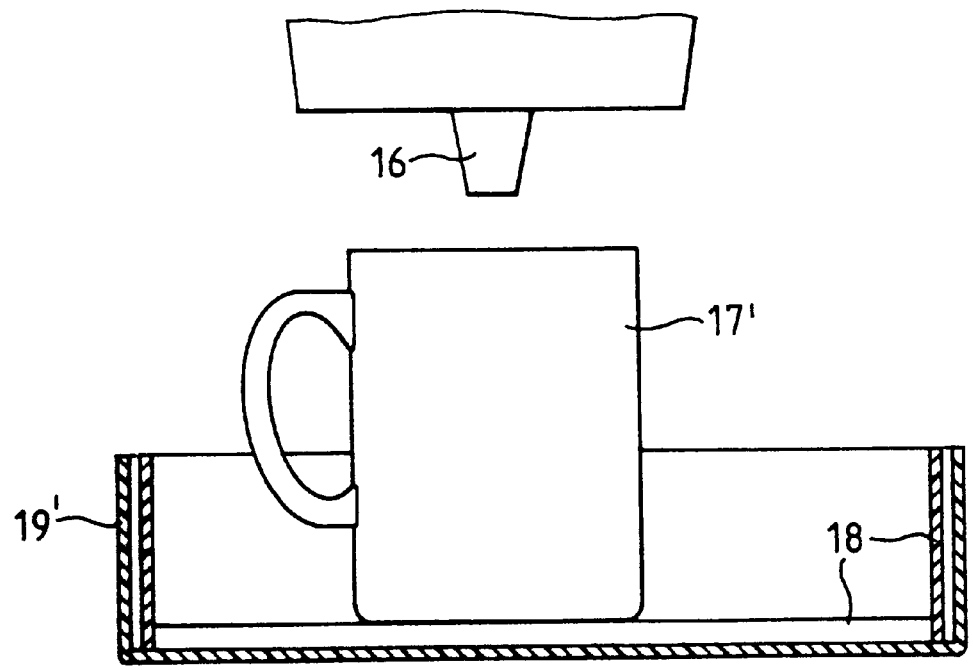

The holding grid 18 on which the coffee cups 17 are placed, is designed in such a way that it can be turned in the insert 19'. Thus, two different spacings between spout 16 and grid 18 can be set, which makes it possible to place coffee cups 17, 17' of very different height under the coffee machine. The distance between the spout 18 and coffee cup 17 must not be too large, otherwise no froth is formed on the coffee. FIG. 6 shows a small coffee cup 17 on the holding grid 18 in the raised position and FIG. 7 a large coffee cup 17' on the grid 18 in the lowered position.

TABLE 3

| Master switch position/Lever | top | bottom |
| --- | --- | --- |
| "Steam" | Steam from steam pipe 35 | none |
| "Off" | None | none |
| "Coffee" | Water from steam pipe 35 | Coffee from spout 16 |

Table 3.

In summarizing, the coffee machine according to the invention essentially comprises a water supply chamber 1, a pump 5, a continuous flow heater 8 for heating water and a brewing chamber 10 for receiving coffee 10'. The continuous flow heater 8 has a low heat capacity. The inventive coffee machine is equipped with at least one temperature sensor 31 at the end of the continuous flow heater 8 or between said heater and the brewing chamber 10, as well as a control loop, whose controlled variable is the water temperature T at the end of the continuous flow heater. With respect to the mechanical and thermal characteristics, the unheated parts 9–12 along the water path between the continuous flow heater and coffee 10' are optimized in such a way that they have an adequate strength for an overpressure occurring in the system and low heat capacities and, with respect to water, low heat transmission coefficients.

What is claimed is:

1. A coffee machine having a water supply chamber, a pump and a brewing chamber for receiving coffee comprising:

a continuous flow heater for heating water comprising an inner tube for allowing water to flow therethrough, at least one inner insulating layer placed around the inner tube, and a filament wound around the at least one inner insulating layer, said continuous flow heater having a low heat capacity;

at least one temperature sensor disposed at the end of the continuous flow heater or between the latter and the brewing chamber; and a control loop in communication with the continuous flow heater, whose controlled variable is the water temperature (T) at the end of the continuous flow heater and that, with respect to mechanical and thermal characteristics, unheated parts along the water path between the continuous flow heater and coffee are so optimized, that they have an adequate strength with respect to an overpressure occurring in the system and have low heat capacities and, with respect to water, low heat transmission coefficients.

2. A coffee machine according to claim 1 wherein one or more unheated parts along the water path are made from thermally insulating material.

3. A coffee machine according to claim 1 wherein one or more unheated parts along the water path are made from highly porous, ceramic material, highly porous plastic or plastic.

4. A coffee machine according to claim 1 wherein the inner tube of the continuous flow heater is made from aluminum, stainless steel or high temperature-resistant plastic, the insulating layers of high temperature-resistant plastic and the filament of high-impedance metal alloy.

5. A coffee machine according to claim 1 wherein the continuous flow heater is mounted in floating manner to avoid lime deposits in the interior of the tube, the pump is suspended in mobile or overhung manner and vibrates during operation and the continuous flow heater and pump are so connected that the continuous flow heater can be made to vibrate by the pump.

6. A coffee machine according to claim 1 wherein the brewing chamber essentially comprises a brewing chamber base and a brewing chamber lid.

7. A coffee machine according to claim 6 wherein for the preparation of different types of coffee, different brewing chamber bases can be inserted in a holder in module-like manner by a user, said holder being in turn slidable into the coffee machine.

8. A coffee machine according to claim 6 wherein the brewing chamber locking means has a lever movable by a user, an eccentric connected to the lever and the brewing chamber lid which can be moved up and down by the eccentric and which locks the brewing chamber, when its base is slid into the coffee machine.

9. A coffee machine according to claim 8 wherein the lever simultaneously controls a water outlet, in that with the brewing chamber open it passes steam or hot water into a steam pipe and with the brewing chamber closed passes hot water to the coffee.

10. A coffee machine according to claim 9 wherein a switching point position for one of the two paths is at an inlet of a connecting tube which is located in a tube casing sealed against the latter by two sealing rings and can be moved together with the brewing chamber lid in such a way that with the brewing chamber open, an upper sealing ring is located above a water inlet, prevents an inflow of hot water or steam into the connecting tube and the hot water or steam can flow to an inlet of the steam pipe and that with the brewing chamber closed, the upper sealing ring is below the water inlet and the hot water can flow to the connecting tube inlet.

11. A coffee machine according to claim 9 wherein a master switch is the switch for putting the coffee machine into and out of operation and a temperature regulator or thermostat for the medium flowing out of the steam pipe.

12. A coffee machine according to claim 11 wherein the master switch has three positions, which can e.g., be called "steam", "off", and "coffee", so that in the "off" position, the coffee machine is switched off, a coffee flow from a spout or the hot water flow from the steam pipe can be brought about by switching from "off" to "coffee" and can be stopped again by switching from "coffee" to "off" and an outflow of steam from the steam pipe can be started by switching from "off" to "steam" and can be stopped again by switching from "steam" to "off".

13. A coffee machine having a water supply chamber, a pump and a brewing chamber for receiving coffee comprising:
    a continuous flow heater with a low heat capacity for heating water;
    at least one temperature sensor disposed at the end of the continuous flow heater or between the latter and the brewing chamber;
    a control loop in communication with the continuous flow heater, whose controlled variable is the water temperature (T) at the end of the continuous flow heater and that, with respect to mechanical and thermal characteristics, unheated parts along the water path between the continuous flow heater and coffee are so optimized, that they have an adequate strength with respect to an overpressure occurring in the system and have low heat capacities and, with respect to water, low heat transmission coefficients; and
    a microprocessor for monitoring and controlling a pumping power ($P_p$) of the pump, a heating power ($P_h$) of the continuous flow heater, and a heating-up time (t).

14. A coffee machine according to claim 13 wherein for each coffee preparation process, the microprocessor calculates from the pumping power ($P_p$) of the pump the heating power ($P_h$) of the continuous flow heater and the heating-up time (t), a measure for the liming of the inner tube of the continuous flow heater and emits an acoustic and/or optical warning signal if the liming has exceeded a given, critical value.

15. A coffee machine having a pump and a brewing chamber for receiving coffee comprising:
    a continuous flow heater with a low heat capacity for heating water;
    at least one temperature sensor disposed at the end of the continuous flow heater or between the latter and the brewing chamber;
    a control loop in communication with the continuous flow heater, whose controlled variable is the water temperature (T) at the end of the continuous flow heater and that, with respect to mechanical and thermal characteristics, unheated parts along the water path between the continuous flow heater and coffee are so optimized, that they have an adequate strength with respect to an overpressure occurring in the system and have low heat capacities and, with respect to water, low heat transmission coefficients; and
    a water supply chamber, said water supply chamber is fitted in a visible manner at the top of the coffee machine, is made from a transparent material, can be removed by a user and is provided with a lid.

16. A coffee machine having a water supply chamber, a pump and a brewing chamber for receiving coffee comprising:
    a continuous flow heater with a low heat capacity for heating water;
    at least one temperature sensor disposed at the end of the continuous flow heater or between the latter and the brewing chamber;
    a control loop in communication with the continuous flow heater, whose controlled variable is the water temperature (T) at the end of the continuous flow heater and that, with respect to mechanical and thermal characteristics, unheated parts along the water path between the continuous flow heater and coffee are so optimized, that they have an adequate strength with respect to an overpressure occurring in the system and have low heat capacities and, with respect to water, low heat transmission coefficients; and
    a weighted base for improving a stability of the coffee machine.

17. A coffee machine according to claim 16 further including a holding grid inserted in the base below the spout and on which can be placed coffee cups and that the holding grid is designed that it can be turned, in order to permit the setting of two different spacings between the spout and the grid.

* * * * *